United States Patent
Hanson et al.

(10) Patent No.: US 12,406,244 B1
(45) Date of Patent: Sep. 2, 2025

(54) AUTOMATED TELLER MACHINE FUEL PUMP

(71) Applicant: Wells Fargo Bank, N.A., San Francisco, CA (US)

(72) Inventors: Carrie Anne Hanson, Charlotte, NC (US); Frank A. DiGangi, Statesville, NC (US); David E. Winner, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/771,698

(22) Filed: Jul. 12, 2024

(51) Int. Cl.
    *G06Q 20/18* (2012.01)
    *G07F 15/00* (2006.01)

(52) U.S. Cl.
    CPC .......... *G06Q 20/18* (2013.01); *G07F 15/001* (2013.01)

(58) Field of Classification Search
    CPC ...................... G06Q 20/18; G06Q 20/1085
    USPC ................................ 235/379, 381; 705/43
    See application file for complete search history.

(56) References Cited

U.S. PATENT DOCUMENTS

| | | | |
|---|---|---|---|
| 5,047,613 A * | 9/1991 | Swegen | G07F 7/00 235/379 |
| 6,116,402 A | 9/2000 | Beach et al. | |
| 6,405,182 B1 | 6/2002 | Cuervo | |
| 6,876,971 B1 | 4/2005 | Burke | |
| 7,331,521 B2 | 2/2008 | Sorenson et al. | |
| 7,797,233 B2 | 9/2010 | Sobek | |
| 8,760,296 B2 | 6/2014 | Martin | |
| 9,290,338 B2 | 3/2016 | Martin et al. | |
| 2001/0045457 A1* | 11/2001 | Terranova | G06Q 20/00 235/381 |
| 2003/0075600 A1* | 4/2003 | Struthers | B67D 7/14 235/381 |
| 2006/0207856 A1 | 9/2006 | Dean et al. | |
| 2016/0005100 A1* | 1/2016 | Zaremba | G06Q 20/18 705/14.27 |
| 2024/0062210 A1* | 2/2024 | Shoup | G06Q 20/204 |

* cited by examiner

*Primary Examiner* — Suezu Ellis
(74) *Attorney, Agent, or Firm* — SCHWEGMAN LUNDBERG & WOESSNER, P.A.

(57) ABSTRACT

Systems and techniques may generally be used to integrate automated teller machine (ATM) functions into one or more fuel pumps at a gas station. An example system may include a media transfer slot and a display screen to present a fuel pump prompt and an automated teller machine (ATM) prompt. The example system may cause a fuel to be dispensed when the fuel pump prompt is selected. The example system may cause the media transfer slot to activate when the ATM prompt is selected.

19 Claims, 6 Drawing Sheets

AUTOMATED TELLER MACHINE FUEL PUMP

BACKGROUND

Fuel pumps are used at filling stations to pump gasoline (petrol), diesel, or other types of liquid fuel into vehicles. Generally, a customer may pay for the liquid fuel at the fuel pump using a credit card or debit card. The customer may go to a store at a gas station to pay for fuel using cash or to buy other products and services offered at the gas station.

A customer may prepay an amount for gas at a fuel pump (e.g., using cash at a gas station). A sales system of the gas station that is in communication with the fuel pump unlocks the fuel pump to allow the customer to pump gas up to the amount. When there is a remaining amount from the prepaid amount, the customer may be refunded the remaining amount.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

The systems and techniques described herein may be used to integrate automated teller machine (ATM) functions into a fuel pump at a gas station. Sometimes, a gas station offers discounts when paying in cash, but a customer may not be carrying any money or does not want to go to the gas station convenience store to make the cash payment.

In some examples, a customer may have a lack of available cash. In some examples, a fuel pump may not have a cash payment capability. The systems and techniques described herein may help a customer to multitask by making financial transactions while waiting for the tank of their car to fill. In various examples, customers may perform a wide variety of transactions at the fuel pump with the integrated ATM services, including making cash withdrawals, making deposits (e.g., cash, checks, or the like), getting balance reports, printing statements, making payments, making a charity donation, or the like.

The systems and techniques described herein may be used to improve the functionality of a fuel pump by integrating ATM functions into the fuel pump. In an example, a customer can make a split payment at the fuel pump using two or more payment methods (e.g., a gift card, a debit card, a credit card, a cash payment, or the like). In another example, a customer may prepay for gas at a fuel pump and receive a cashback when not pumping the whole value. In an example, the cashback could be a credit for later use (e.g., for buying services and products at the gas station, for use at partner stores, or the like). In some examples, the credit may be shared with a third party for use by the third party (e.g., a daughter, a spouse, or the like).

In some examples, a customer may receive reward points, a cashback reward, a discounted price, or the like, related to a service or product of the gas station for using an ATM service at the fuel pump. The amount of discount, cashback points, or fidelity points earned for using the ATM service at the fuel pump may vary according to the customer type or operator of the fuel station. For example, a premier customer of a bank or the fuel station may receive a bigger discount than a regular customer. In another example, a customer may receive a bigger discount when they have a mortgage with the ATM service provider.

Figure 1:
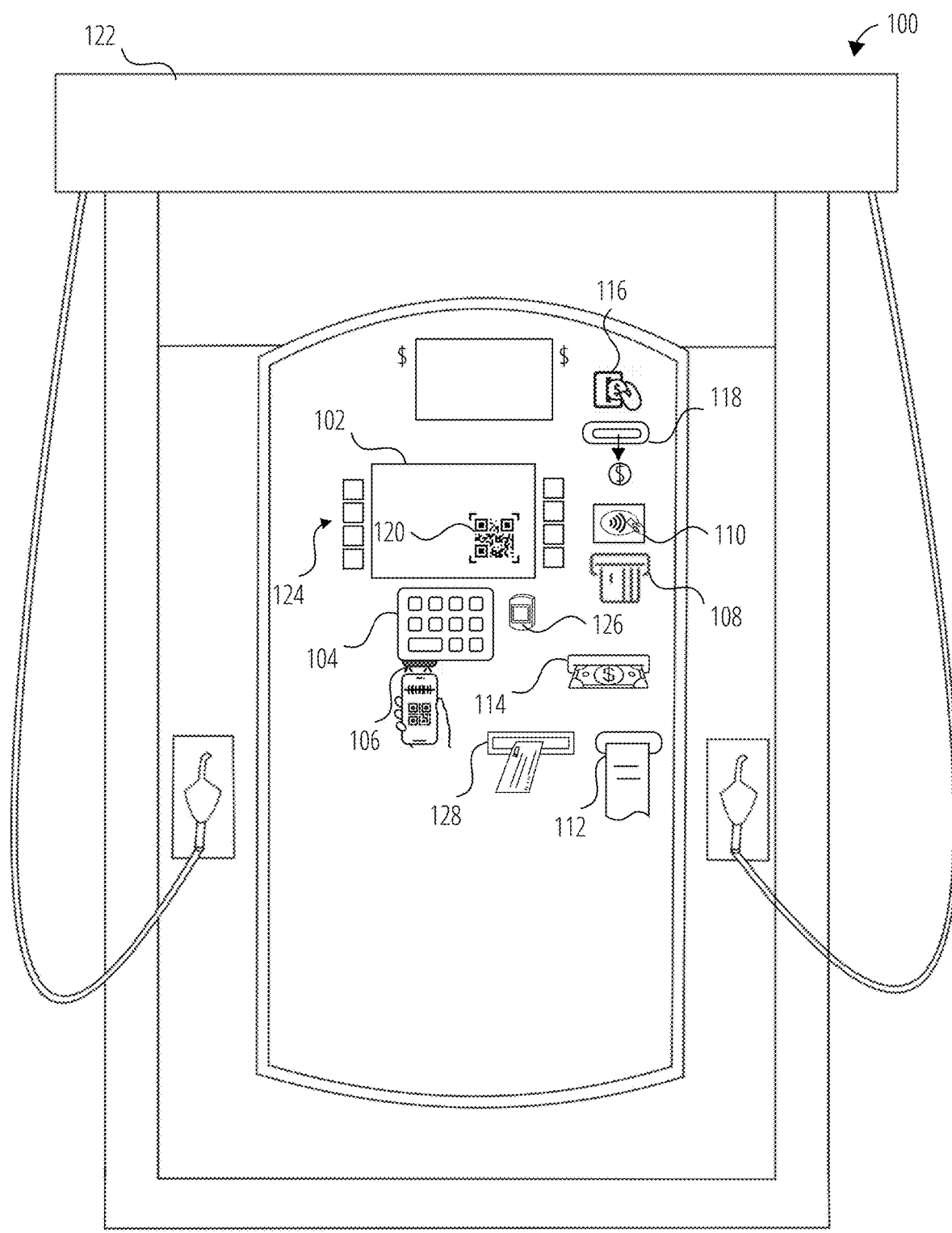
FIG. 1 illustrates a combination of an automated teller machine (ATM) and a fuel pump, in accordance with some examples.

FIG. 1 illustrates a system 100 including a combination of an ATM and a fuel pump 122, according to some examples. In some examples, the system 100 includes an ATM integrated into a fuel pump, using the same processing circuitry. In other examples, the system 100 includes an after-market ATM added to the fuel pump, each having its own processing circuitry.

The system 100 may be used for payment of a transaction (e.g., payment for services, products, or both at a gas station), for deposits, cash withdrawal, or the like. The system 100 includes a fuel pump 122 having display screen 102, a plurality of buttons 124, a pin pad 104, a scanner 106, a card reader 108, a tap reader 110, a printer 112, a media transfer slot 114, a coin acceptor 116, a coin dispenser 118, a check deposit slot 128, and a biometric sensor 126. The system 100 is configured to execute ATM functions and fuel pump functions. In some examples, the media transfer slot and the check deposit slot are a single deposit slot. The system 100 may include a cash vault (e.g., a small cash vault inside the fuel pump 122).

In an example, the display screen 102 may be a touch-screen including a touch panel layered on top of a visual display. In another example, the display screen 102 may include a visual display configured to be controlled by the plurality of buttons 124. The display screen 102 may be configured to present a user interface including an ATM prompt and a fuel pump prompt.

In some examples, a user can access a user account of a financial institution (e.g., a bank account) at the fuel pump 122 using the display screen 102, the pin pad 104, or an input device (e.g., the card reader 108, the tap reader 110, the scanner 106, the biometric sensor 126, or the like). The user may access the user account of the financial institution after entering a bank card information (e.g., by inserting or swiping the bank card on the card reader 108, by tapping the bank card on the tap reader 110, by using a digital wallet at the tap reader 110, or the like) or a personal identification number (PIN) on the pin pad 104. The access to the user account may allow the user to use an ATM service at the fuel pump 122. The display screen 102 may display information and a service option of the user account (e.g., user bank account). The ATM service may include money withdrawal (e.g., using the media transfer slot 114 or the like), a deposit (e.g., check deposit by inserting checks on the check deposit slot 128, cash deposit by inserting bills on the media transfer slot 114 or coins on the coin acceptor 116, or the like), a payment (e.g., make a money transfer to make a payment, read a code using the scanner 106 to execute a transaction, or the like), consult account balance or statement, print a statement (e.g., using the printer 112), order new checks, donate to charity, check rewards balance, change settings (e.g., change a card's PIN, set language preferences, set ATM privacy settings, change a phone number, or the like), set up a debit card overdraft service, or the like. In some examples, the user may receive a discount, cashback, a reward, or the like, when using the ATM services at the fuel pump 122 (e.g., paying for a service or a product of the gas station, or the like).

In an example, the user may access a user bank account using an application on a user device (e.g., a personal computer, a smartphone, a tablet, a laptop, or the like) to generate a code (e.g., a barcode, a matrix barcode a number received through short message service (SMS), a temporary token, or the like). The code may be read at the scanner 106 or typed at the pin pad 104 or via the plurality of buttons 124 to access the user bank account at the fuel pump 122 (e.g., display on the display screen 102 the user bank account information, functionalities, or the like). In another example, the user may pre-stage a transaction on the user bank account using the user device to generate a code. The generated code can be read at scanner 106 or typed on pin pad 104 which allows the user to conclude the transaction on the fuel pump 122. In an example, the user may initiate a transaction (e.g., pay for services or products at a gas station) using the user bank account on the user device to generate a code. For example, the code can include credit that may be used towards a payment at the fuel pump 122. The code may be read at scanner 106 or typed at pin pad 104 to conclude the transaction at the fuel pump 122. The code may be sharable to a third party.

In an example, the user may make a prepayment for a service or a product at the gas station (or for both, a service and a product at the gas station) using the user bank account on the fuel pump 122 to generate a code (e.g., a sharable code to a third party). The user may buy credit for paying for a transaction at a gas station using the user bank account on the fuel pump 122. A shareable code may be generated to use the credit.

The gas station may offer a discount for a cash payment for a transaction but the user may not have available cash. The user may use the fuel pump 122 to access the user bank account and withdraw money at the media transfer slot 114, for example. In an example, the user may access the user bank account at the fuel pump 122 and transfer money from the user bank account to execute a payment for the transaction (e.g., transfer money from the user bank account to an account corresponding to the fuel pump 122, a Zelle® transfer to the account corresponding to the fuel pump 122, or the like) and the gas station may treat the payment for the transaction as a cash payment. The payment for the transaction may include a payment for at least one of a gas fuel, a diesel fuel, products at a vending machine, products at a gas station store, a change of oil, a car wash, or the like.

In an example, the user may make a cash payment (e.g., prepay for gas fuel) directly at the fuel pump 122 by introducing cash at the media transfer slot 114. The user may receive cash change at the media transfer slot 114 or at the coin dispenser 118.

In some examples, the user may use the user device to scan a code (e.g., matrix barcode 120 or the like) displayed on display screen 102 to prompt a bank service (e.g., a payment using the user bank account, a Zelle® transfer, or the like).

In some examples, the user may execute a split payment by using two or more payment methods (e.g., a money transfer, a cash payment, a debit card, a credit card, a gift card, an e-credit, or the like) at the fuel pump 122 to pay for the transaction at the gas station. In some examples, the user may make a split payment using two or more bank accounts at the fuel pump 122.

In various examples, the fuel pump 122 is configured to permit access to accounts of a plurality of financial institutions. In other examples, the fuel pump 122 is configured to permit access to accounts of a single financial institution (e.g., a dedicated ATM).

In some examples, the user may deposit coins at the user bank account through the coin acceptor 116. In other examples, the user may exchange coins for bills by inserting coins in the coin acceptor 116 and getting bills at the media transfer slot 114.

The user may print a receipt for a transaction at the printer 112. In an example, the user may order new checks at the fuel pump 122. In another example, the ordered new checks may be printed at the fuel pump 122 (e.g., at the printer 112, at a printer coupled to the fuel pump 122, or the like).

Figure 2:
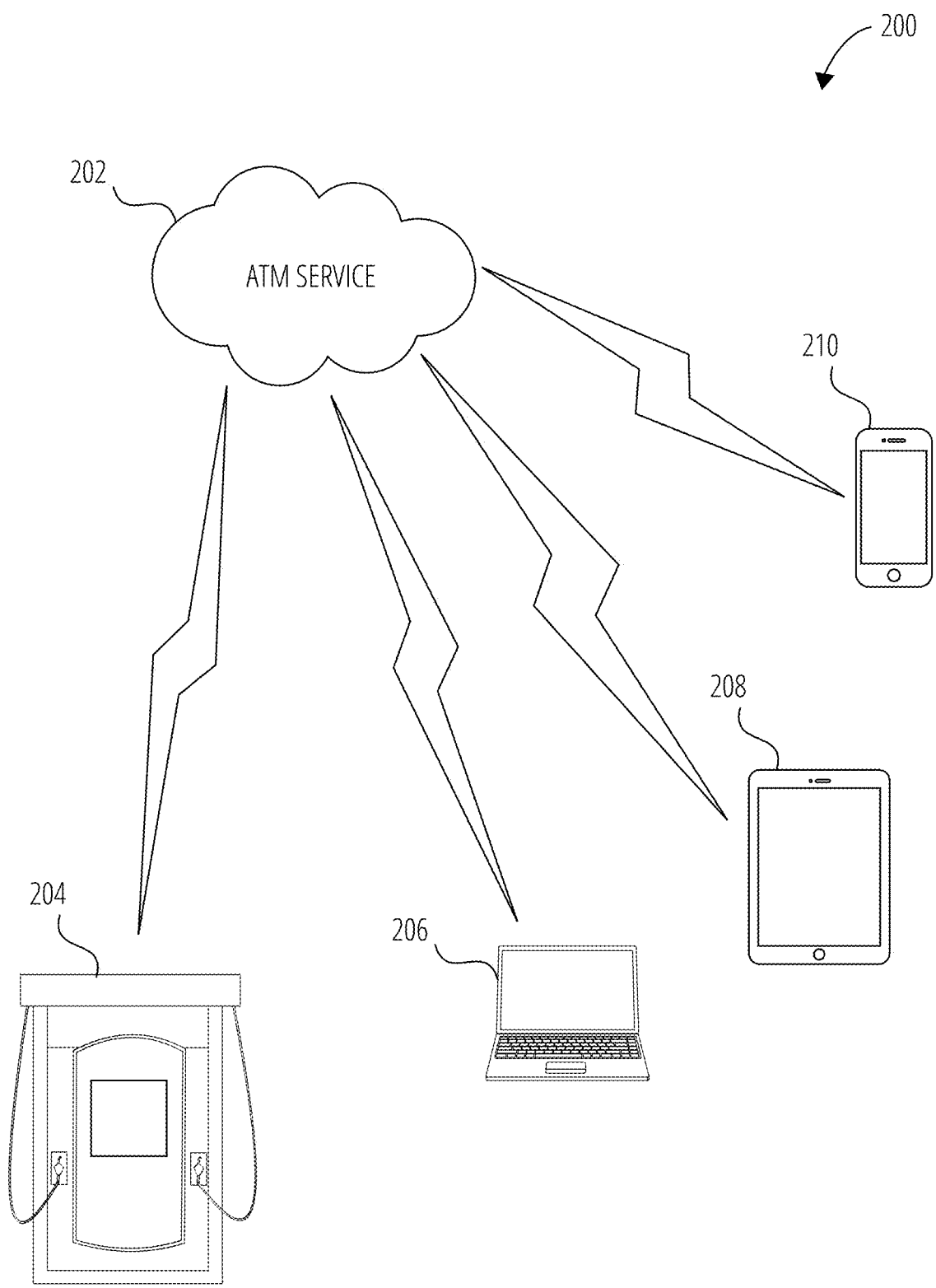
FIG. 2 illustrates a combination of ATM and fuel pump in communication with one or more of external devices, in accordance with some examples.

FIG. 2 is a diagram illustrating an ATM communication system 200, according to some examples. The ATM communication system 200 provides for communication between an ATM integrated into a fuel pump 204 (e.g., the system 100) and a user device (e.g., a laptop device 206, a tablet device 208, a smartphone device 210, or the like). The ATM integrated into the fuel pump 204 may be a pre-configured solution with a single processing circuitry for the ATM and the fuel pump or an aftermarket solution where the ATM is added to the fuel pump and the ATM has a separate processing circuitry from the fuel pump.

The user may use a user device to pre-stage a transaction on the ATM integrated into the fuel pump 204. The user may use the user device (e.g., the smartphone device 210, the laptop device 206, the tablet device 208, or the like) while at home or in-line at the gas station, for example. The user device may be connected to an ATM service 202, which may be hosted in a cloud service. The ATM service 202 may communicate with the ATM integrated into the fuel pump 204 and provide information about the available products and services at the ATM integrated into the fuel pump 204. Different settings may be used based on the location, type, or other characteristics of the ATM integrated into the fuel pump 204. In this way, the user may pre-stage or complete a transaction related to the ATM integrated into a fuel pump 204.

Using an application, web page, or other interface, the user may pre-stage a transaction of a plurality of available transactions for the ATM integrated into the fuel pump 204 to be concluded at the ATM integrated into a fuel pump 204. The transaction may be set specifically for a card (e.g., a card linked to the user bank account, or the like). In this way, the transaction may be concluded when the user uses the card at the ATM integrated into a fuel pump 204 (e.g., inserts or swipes the card at the card reader 108, taps the card on the tap reader 110, uses a digital wallet including the card at the tap reader 110, or the like). In an example, the pre-staged transaction is linked to a code generated on the user device. The pre-staged transaction may be concluded at the ATM integrated into the fuel pump 204 when the code is scanned (e.g., at the scanner 106 shown in FIG. 1) or typed on a pin pad (e.g., the pin pad 104) at the fuel pump 204 with the integrated ATM service. In an example, the pre-staged transaction may be linked to a license plate, that is, the transaction is concluded at the ATM integrated into the fuel pump 204 when the license plate is typed on the pin pad or scanned on a license plate scanner (e.g., a sensor camera, or the like). In some examples, the license plate may be used as a two-factor authentication to conclude a transaction or to access a bank account at the fuel pump 204 with the integrated ATM services.

In some examples, the user may pre-stage a transaction at the ATM integrated into the fuel pump 204. The ATM integrated into the fuel pump 204 may generate and display a code (e.g., a matrix barcode 120, a temporary token, a number code, or the like) on the screen of the fuel pump 204. The user may scan or type the code on the user device to conclude the pre-staged transaction on the user device. In an example, the scanning or typing of the code prompts the user to access the user bank account on the user device to conclude the pre-staged transaction (e.g., make a transfer from the user bank account to an account linked to the fuel pump 204, make a Zelle® transfer, or the like). In some examples, a user may pre-stage a plurality of transactions at the ATM integrated into the fuel pump 204. The user may choose which transactions of the plurality of pre-staged transactions to complete on the user device.

In an example, the user may use the user device to locate gas stations having an ATM integrated into a fuel pump (e.g., the fuel pump 204).

Figure 3:
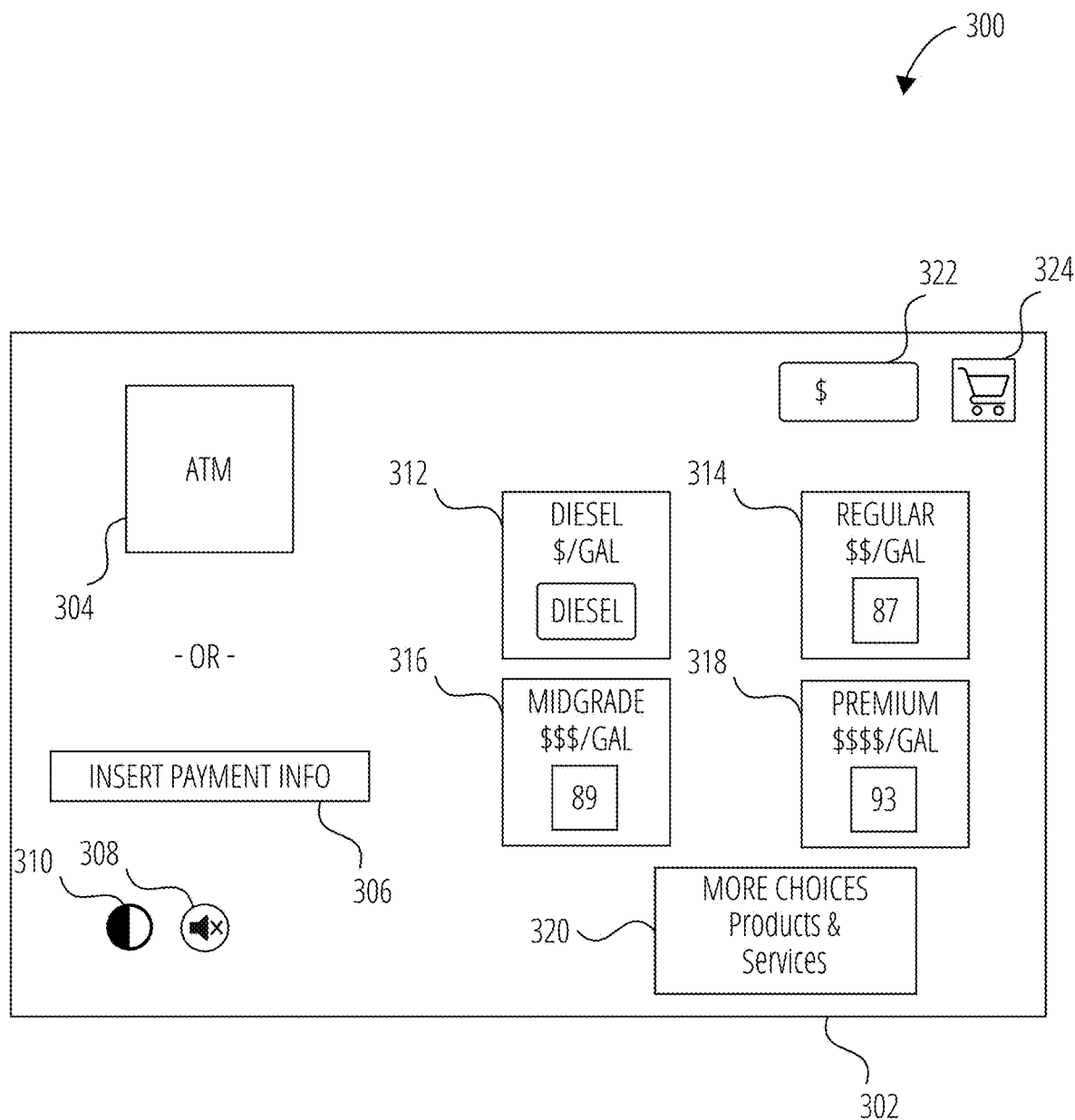
FIG. 3 illustrates a graphical user interface including an ATM prompt and a fuel pump prompt, in accordance with some examples.

FIG. 3 illustrates a graphical user interface (GUI) 300 displayed on the display screen 302 (e.g., display screen 102) of a fuel pump with integrated ATM services (e.g., 124, 204, or the like), according to some examples. The GUI 300 includes various user interface components, such as an ATM selection 304, a payment selection 306, a type of fuel selection (e.g., diesel 312, regular 314, midgrade 316, premium 318, or the like), a more choices selection 320, a contrast adjustment icon 310, and a mute icon 308. The graphical user interface 300 may include an amount owed button 322 or a cart button 324. The cart button 324 when selected may display a service at the gas station, a product at the gas station, fuel, or the like, added to a transaction. The amount owed button 322 may indicate the value owed for the transaction. The position of the various user interface components displayed on the GUI 300 may vary. In an example, the amount owed button 322 may dynamically show the amount owed for fuel while pumping fuel.

A user may select the payment selection 306 for pre-payment at the fuel pump (e.g., pre-payment for fuel, for a car wash, for a product at a vending machine, for a product at the gas station, for a service at the gas station, for a combination thereof, or the like). After selecting the payment selection 306, the user may be prompted to insert a card information (e.g., insert or swipe a bank card, tap the bank card, tap a digital wallet device, or the like).

The user may select a type of fuel (e.g., diesel 312, regular 314, midgrade 316, premium 318, or the like) to initiate a transaction. The user may select the more choices selection 320 to add a product or a service at the gas station to a new or to an ongoing transaction.

The user may adjust the display screen 302 contrast by clicking on the contrast adjustment icon 310. The user may mute or unmute the sound on the display screen 302 by clicking on the mute icon 308.

In some examples, the ATM selection 304 appears on the display screens 302 after a user presses a physical button at the fuel pump for ATM services. A user may select the ATM selection 304 to initiate a login to a user bank account at the ATM service integrated into the fuel pump. In an example, when a user selects ATM selection 304, the user is prompted to insert a bank card information. Inserting the bank card information may include inserting or swiping the bank card on a card reader, tapping the bank card on the tap reader, tapping a digital wallet including the bank card on the tap reader, or the like. After selecting the ATM selection 304, the user may be prompted to type a code using a pin pad on the fuel pump (e.g., a PIN code, a license plate number, a temporary token, or the like).

In an example, the ATM selection 304 can be selected at a physical button at the fuel pump. A user may pre-stage an ATM transaction to be completed at the fuel pump. In an example, the ATM selection 304 may be selected when the user enters information about the pre-staged ATM transaction on the fuel pump. Entering information about the pre-staged ATM transaction may include reading a code at a scanner at the fuel pump, typing a license plate on a pin pad at the fuel pump, capturing a license plate via a sensor camera at the fuel pump, tapping a user device on a near field communication (NFC) reader, or the like.

In an example, after a user selects the ATM selection 304, a graphical user interface 400 is displayed. In another example, after the user selects the ATM selection 304, an option for paying for fuel using a bank account is displayed.

Figure 4:
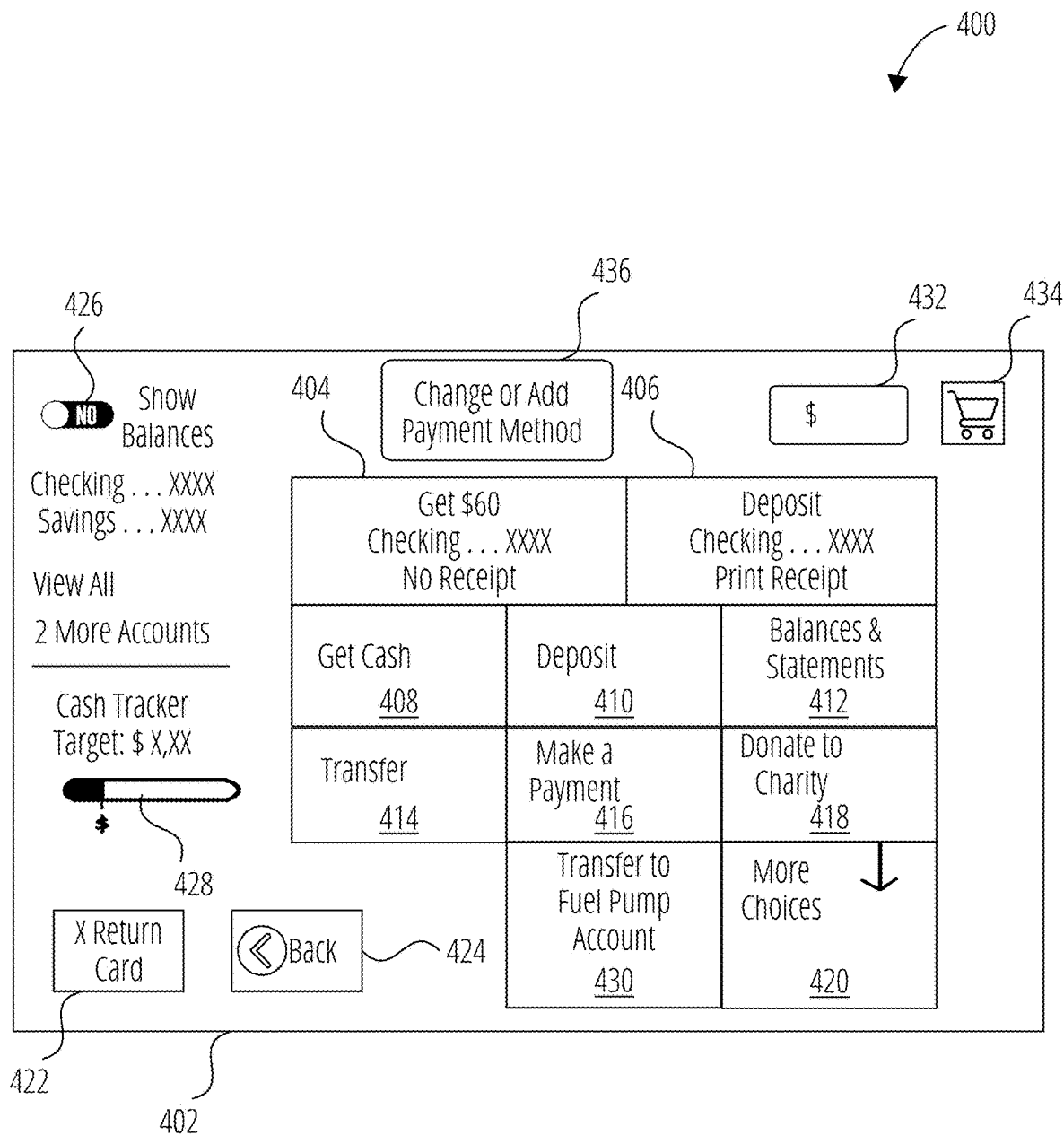
FIG. 4 illustrates a graphical user interface including a set of selectable ATM services, in accordance with some examples.

FIG. 4 illustrates a graphical user interface (GUI) 400 displayed on the display screen 402 of a fuel pump with integrated ATM services for user interaction with the ATM services for a user account at a financial institution (e.g., a bank account, or the like) in accordance with some examples.

The graphical user interface 400 includes various user interface components, such as selectable options for ATM services. The position of the various user interface components displayed on the GUI 400 may vary. The selectable options for ATM services may include selectable options to get $60 dollars without a receipt 404, to make a deposit on a checking account and print a receipt 406, to get cash 408, to make a deposit 410, view or print balances and statements 412, to make a transfer 414, to make a payment 416, to donate to charity 418, to make a transfer to fuel pump button 430, to more choices 420, or the like.

The GUI 400 may include an amount owed button 432, a cart button 434, or both. The cart button 434 when selected may display a service at the gas station, a product at the gas station, fuel, or the like, added to a transaction. The amount owed button 432 may indicate the value owed for the transaction.

In an example, the amount owed button 432 may dynamically show the amount owed for fuel while pumping fuel. While pumping fuel, GUI 400 may display an option to change the payment method 436 (e.g., change from a credit card payment to a money transfer from a user account, or vice-versa, or the like). The GUI 400 may display an option to add an additional payment method 436 to make a split payment (e.g., a money transfer, a cash payment, a debit card, a credit card, a gift card, an e-credit, or the like). After selecting the payment selection 416, the user may include a payment method to pay for a transaction. In an example, after selecting the payment selection 416 the user may include a plurality of payment methods to pay for the transaction (i.e., make a split payment for the transaction).

The GUI 400 may include a toggle button 426 to allow a user to select to either show or hide an account balance. The GUI 400 may include a cash tracker 428. The cash tracker 428 may show the progress over time of a target created by the user (e.g., a cash withdraw monthly target, or the like). The GUI 400 may include a return card icon 422. The selection of the icon 422 ends the ATM session and prompts the user to remove any inserted card.

The GUI 400 may include a back button 424 to return to the previous GUI displayed (e.g., graphical user interface 300, or the like). In an example, when a user selects the back button 424, the user remains logged into the user account on the ATM services.

On the GUI 400, the user may select a quick option to withdraw cash (404) or to make a deposit (406).

The user may select the selectable option to make a payment 416 to execute a transaction. The transaction may include a payment at the fuel pump for a service, a product, fuel, or a combination thereof. The transaction may include paying a bill (e.g., a credit card bill, a utility bill, or the like). The payment may include a transfer to an account of the gas station from the user account (e.g., a transfer to a bank account corresponding to the fuel pump, or the like). In an example, GUI 400 may include a button 430 to transfer an amount from the user account to an account corresponding to the fuel pump. In an example, the transfer to the account corresponding to the fuel pump is a payment for a transaction treated as a cash payment. The transaction may be a purchase of a service at the gas station, a product at the gas station, fuel at the fuel pump, a product at a vending machine, or a combination thereof.

The user may select the selectable more choices option 420. The more choices selection 420 may include options to check rewards, change settings (e.g., change a card's PIN, set language preferences, set ATM privacy settings, change a phone number, or the like), set up a debit card overdraft service, or the like.

Figure 5:
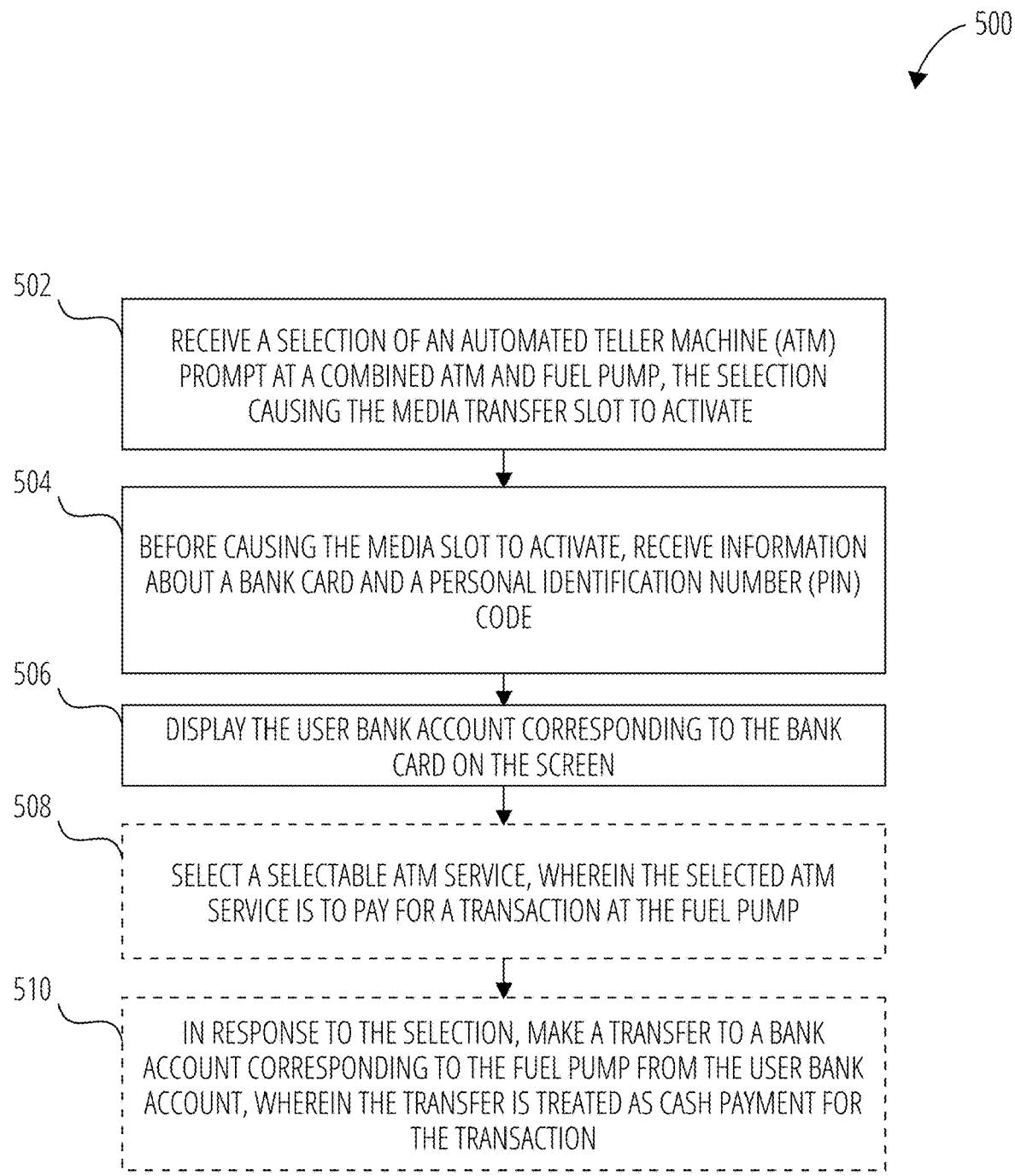
FIG. 5 is a flowchart illustrating a technique for using a combined ATM and fuel pump, in accordance with some examples.

FIG. 5 illustrates a flowchart showing a technique 500 for integrating ATM functions into a fuel pump in accordance with some examples. In an example, operations of the technique 500 may be performed by processing circuitry, for example, by executing instructions stored in memory. The processing circuitry may include a processor, a system chip, or other circuitry (e.g., wiring). For example, the technique 500 may be performed by processing circuitry of a device (or one or more hardware or software components thereof), such as those illustrated and described with reference to FIG. 1.

The technique 500 includes an operation 502 to receive a selection of an automated teller machine (ATM) prompt at a combined ATM and fuel pump, the selection causing the media transfer slot to activate. The fuel pump with integrated ATM services may include a display screen, a pin pad, a card reader, a tap reader, a media transfer slot, a scanner, a coin acceptor, a coin dispenser, and a receipt printer.

In operation 504, technique 500, before causing the media slot to activate, receives information about a bank card and a personal identification number (PIN) code. In an example, receiving information about the bank card is based on at least one of a card tap, a digital wallet tap, a card swipe, or a card insertion. The media transfer slot may include a card reader, a tap reader, a scanner, or the like.

In operation 506, technique 500 displays the user bank account corresponding to the bank card on the screen. In an example, displaying the user bank account includes displaying a set of selectable ATM services. The set of selectable ATM services may include making a payment, a deposit, a cash withdrawal, an order of new checks, a charity donation, or the like.

In some examples, in operation 508, technique 500 selects a selectable ATM service, wherein the selected ATM service is to pay for a transaction at the fuel pump. The transaction at the fuel pump may include payment for a gas fuel, a diesel fuel, a car wash, an oil change, a product of a gas station, a product of a vending machine, a service of the gas station, a combination thereof, or the like.

In some examples, in operation 510, technique 500, in response to the selection, makes a transfer to a bank account corresponding to the fuel pump from the user bank account, wherein the transfer is treated as cash payment for the transaction In some examples, the technique 500, in response to the money transfer, dispenses a receipt at a receipt printer.

Figure 6:
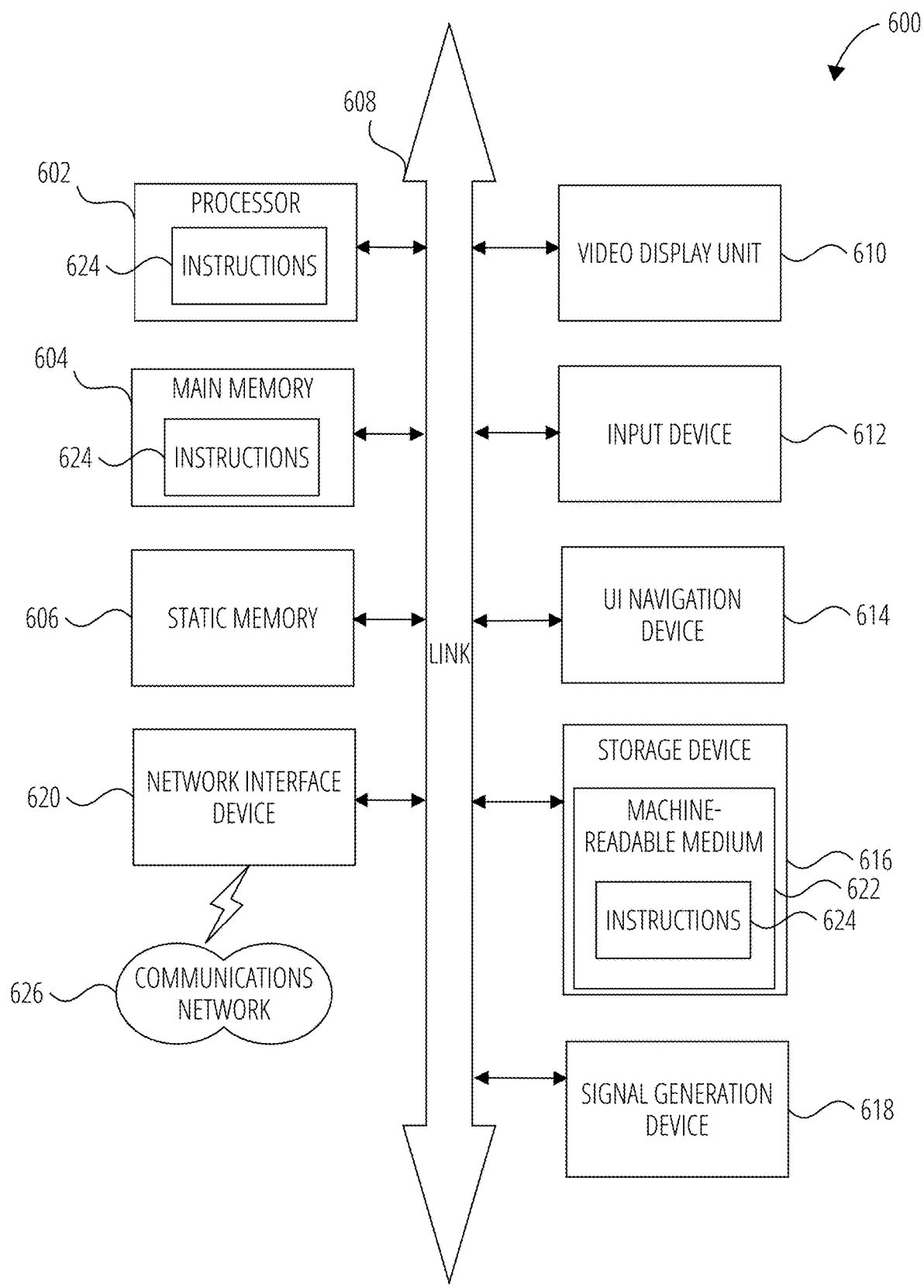
FIG. 6 illustrates generally an example of a block diagram of a machine upon which any one or more of the techniques discussed herein may perform in accordance with some examples.

FIG. 6 is a block diagram illustrating a machine in the example form of computer system 600, within which a set or sequence of instructions may be executed to cause the machine to perform any one of the methodologies discussed herein, according to an example. In alternative examples, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, or the like), a main memory 604, and a static memory 606, which communicate with each other via a link 608. The computer system 600 may further include a video display unit 610, an input device 612 (e.g., a keyboard), and a user interface UI navigation device 614 (e.g., a mouse). In one example, the video display unit 610, input device 612, and UI navigation device 614 are incorporated into a single device housing such as a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensors.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, the static memory 606, and/or within the processor 602 during execution thereof by the computer system 600, with the main memory 604, the static memory 606, and the processor 602 also constituting machine-readable media.

While the machine-readable medium 622 is illustrated in an example to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding, or carrying instructions for execution by the machine and that causes the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 622 that excluded transitory signals.

The instructions 624 may further be transmitted or received over a communications network 626 using a transmission medium via the network interface device 620 utilizing any one of a number of well-known transfer protocols (e.g., HTTP). Examples of communication networks include a Local Area Network (LAN), a Wide Area Network (WAN), the Internet, mobile telephone networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Each of these non-limiting examples may stand on its own, or may be combined in various permutations or combinations with one or more of the other examples.

Example 1 is a system comprising: a media transfer slot; and a display screen to present: a fuel pump prompt, which when selected causes fuel to be dispensed; and an automated teller machine (ATM) prompt, which when selected causes the media transfer slot to activate.

In Example 2, the subject matter of Example 1 includes, processing circuitry; and memory including instructions, which when executed by the processing circuitry, cause the processing circuitry to, before causing the fuel to be dispensed, receive payment information for the fuel.

In Example 3, the subject matter of Examples 1-2 includes, wherein the media transfer slot, when activated, causes at least one of a cash to be dispensed, cash to be received as a deposit, or a check to be received as a deposit.

In Example 4, the subject matter of Examples 1-3 includes, wherein the system further includes a card reader or a scanner.

In Example 5, the subject matter of Examples 1-4 includes, processing circuitry; and memory including instructions, which when executed by the processing circuitry, cause the processing circuitry to: before causing the media transfer slot to activate, receive information about a bank card and a personal identification number (PIN) code, based on at least one of a card tap, a digital wallet tap, a card swipe, or a card insertion; and display a user bank account on the display screen, the user bank account corresponding to the bank card.

In Example 6, the subject matter of Example 5 includes, wherein to display the user bank account includes to display a set of selectable ATM services and wherein the instructions, when executed, further cause the processing circuitry to receive a selection of a selectable ATM service of the set of selectable ATM services.

In Example 7, the subject matter of Example 6 includes, wherein the set of selectable ATM services includes at least one selectable indication of a money transfer, a cash deposit, a cash withdrawal, a check deposit, a charity donation, a payment, or a receipt print.

In Example 8, the subject matter of Examples 1-7 includes, wherein the system further comprises: a fuel pump coupled to the display screen; processing circuitry; and memory including instructions, which when executed by the processing circuitry, cause the processing circuitry to: receive a request to execute a transaction at the fuel pump including an indication of a user account to transfer money from the user account to complete the transaction; in response to the request, cause the money to be transferred from the user account to a bank account corresponding to the fuel pump; and in response to receiving an indication that the money was transferred, output an indication that the transaction was executed.

In Example 9, the subject matter of Example 8 includes, wherein the transaction is identified by the fuel pump as a cash transaction.

In Example 10, the subject matter of Examples 1-9 includes, processing circuitry; and memory including instructions, which when executed by the processing circuitry, cause the processing circuitry to: receive a selection of two or more payment methodsdiums to execute a transaction; and execute the transaction using the selected two or more payment methodsdiums, at least one of the two or more payment methodsdiums including one of a credit card, a debit card, a gift card, a cash payment, or a payment through a bank account.

In Example 11, the subject matter of Example 10 includes, wherein the instructions, when executed, further cause the processing circuitry to, in response to execution of the transaction, cause a receipt to be dispensed at a printer of the system.

In Example 12, the subject matter of Examples 1-11 includes, wherein causing the media transfer slot to activate includes causing the media transfer slot to dispense cash in response to a request for a withdrawal from a bank account, the media transfer slot including a bill dispenser.

In Example 13, the subject matter of Examples 1-12 includes, wherein the system further includes a scanner to read a matrix barcode displayed on a user device, the matrix barcode including a payment credit.

In Example 14, the subject matter of Examples 1-13 includes, processing circuitry; and memory including instructions, which when executed by the processing circuitry, cause the processing circuitry to: in response to causing the media transfer slot to activate, cause the media transfer slot to open to receive cash in response to a request to make a deposit, the media transfer slot including a bill deposit slot.

In Example 15, the subject matter of Examples 1-14 includes, processing circuitry; and memory including instructions, which when executed by processing circuitry, cause the processing circuitry to: receive a request for a deposit to a user bank account; prompt a user to insert media at the media transfer slot corresponding to the deposit; receive a plurality of coins in the media transfer slot, the media transfer slot including a coin acceptor; and in response to receiving the plurality of coins, update a balance of the user bank account.

In Example 16, the subject matter of Examples 1-15 includes, wherein the system further comprises: a controller in communication with the media transfer slot and the display screen; and a storage device in communication with the controller, the storage device configured to store data corresponding to the ATM prompt and the fuel pump prompt, wherein the controller is configured to dynamically generate a user interface for display on the display screen based on a user input and data retrieved from the storage device.

In Example 17, the subject matter of Example 16 includes, wherein the user input includes at least one of a selection of the ATM prompt, or a selection of the fuel pump prompt.

In Example 18, the subject matter of Examples 1-17 includes, wherein the system further comprises: first processing circuitry in communication with a first data server, the first data server configured to store data corresponding to the fuel pump prompt; second processing circuitry in communication with a second data server, the second data server configured to store data corresponding to the ATM prompt; and wherein the first processing circuitry and the second processing circuitry are each configured to generate a portion of a user interface for display on the display screen.

Example 19 is at least one non-transitory machine-readable medium including instructions, which when executed by processing circuitry, cause the processing circuitry to perform operations to: display on a display screen of a fuel pump a set of user interface components, the set of user interface components including a selectable automated teller machine (ATM) option and a selectable fuel pump option; receive a selection of the selectable ATM option; and in response to receiving the selection of the selectable ATM option, display, on the display screen of the fuel pump, a user interface including a set of selectable ATM services.

In Example 20, the subject matter of Example 19 includes, wherein the instructions further cause the processing circuitry to perform operations to: receive a request to execute a transaction at the fuel pump; receive a selection of a selectable ATM service of the set of selectable ATM services, the selectable ATM service including a money transfer corresponding to the transaction; in response to receiving the selection, initiate the money transfer to a bank account corresponding to the fuel pump from a user bank account; and in response to receiving confirmation of the money transfer, output an indication that the transaction was executed.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include but are not limited to, hard disks, removable magnetic disks, removable optical disks (e.g., compact disks and digital video disks), magnetic cassettes, memory cards or sticks, random access memories (RAMs), read-only memories (ROMs), and the like.

What is claimed is:

1. A system comprising:
a media transfer slot;
a display screen to present:
a fuel pump prompt, which when selected causes fuel to be dispensed; and
an automated teller machine (ATM) prompt, which when selected causes the media transfer slot to activate;
a processing circuitry; and
a memory comprising instructions, which when executed by the processing circuitry, cause the processing circuitry to:
before causing the media transfer slot to activate, receive information about a bank card and a personal identification number (PIN), based on at least one of a card tap, a digital wallet tap, a card swipe, or a card insertion; and
display a user bank account on the display screen, the user bank account corresponding to the bank card.

2. The system of claim 1, the memory further comprising additional instructions, which when executed by the processing circuitry, cause the processing circuitry to:
before causing the fuel to be dispensed, receive payment information for the fuel.

3. The system of claim 1, wherein the media transfer slot, when activated, causes at least one of a cash to be dispensed, cash to be received as a deposit, or a check to be received as a deposit.

4. The system of claim 1, wherein the system further includes a card reader or a scanner.

5. The system of claim 1, wherein to display the user bank account includes to display a set of selectable ATM services and wherein the instructions, when executed, further cause the processing circuitry to receive a selection of a selectable ATM service of the set of selectable ATM services.

6. The system of claim 5, wherein the set of selectable ATM services includes at least one selectable indication of a money transfer, a cash deposit, a cash withdrawal, a check deposit, a charity donation, a payment, or a receipt print.

7. The system of claim 1, wherein the system further comprises:
a fuel pump coupled to the display screen
wherein the memory further comprises additional instructions, which when executed by the processing circuitry, cause the processing circuitry to:
receive a request to execute a transaction at the fuel pump including an indication of a user account to transfer money from the user account to complete the transaction;
in response to the request, cause the money to be transferred from the user account to a bank account corresponding to the fuel pump; and in response to receiving an indication that the money was transferred, output an indication that the transaction was executed.

8. The system of claim 7, wherein the transaction is identified by the fuel pump as equivalent to a cash transaction for receiving a discount.

9. The system of claim 1, the memory further comprising additional instructions, which when executed by the processing circuitry, cause the processing circuitry to:
receive a selection of two or more payment methods to execute a transaction; and
execute the transaction using the selected two or more payment methods, at least one of the two or more payment methods including one of a credit card, a debit card, a gift card, a cash payment, or a payment through the user bank account.

10. The system of claim 9, wherein the additional instructions, when executed, further cause the processing circuitry to:
in response to execution of the transaction, cause a receipt to be dispensed at a printer of the system.

11. The system of claim 1, wherein causing the media transfer slot to activate includes causing the media transfer slot to dispense cash in response to a request for a withdrawal from the user bank account, the media transfer slot including a bill dispenser.

12. The system of claim 1, wherein the system further includes a scanner to read a matrix barcode displayed on a user device, the matrix barcode including a payment credit.

13. The system of claim 1, the memory further comprising additional instructions, which when executed by the processing circuitry, cause the processing circuitry to:
in response to causing the media transfer slot to activate, cause the media transfer slot to open to receive cash in response to a request to make a deposit, the media transfer slot including a bill deposit slot.

14. The system of claim 1, the memory further comprising additional instructions, which when executed by the processing circuitry, cause the processing circuitry to:
receive a request for a deposit to the user bank account;
prompt a user to insert media at the media transfer slot corresponding to the deposit;
receive a plurality of coins in the media transfer slot, the media transfer slot including a coin acceptor; and
in response to receiving the plurality of coins, update a balance of the user bank account.

15. The system of claim 1, wherein the system further comprises:
a controller in communication with the media transfer slot and the display screen; and
a storage device in communication with the controller, the storage device configured to store data corresponding to the ATM prompt and the fuel pump prompt, wherein the controller is configured to dynamically generate a user interface for display on the display screen based on a user input and data retrieved from the storage device.

16. The system of claim 15, wherein the user input includes at least one of a selection of the ATM prompt, or a selection of the fuel pump prompt.

17. The system of claim 1, wherein the system further comprises:
first processing circuitry in communication with a first data server, the first data server configured to store data corresponding to the fuel pump prompt;
second processing circuitry in communication with a second data server, the second data server configured to store data corresponding to the ATM prompt; and
wherein the first processing circuitry and the second processing circuitry are each configured to generate a portion of a user interface for display on the display screen.

18. At least one non-transitory machine-readable medium including instructions, which when executed by processing circuitry, cause the processing circuitry to perform operations to:
display on a display screen of a fuel pump a set of user interface components, the set of user interface components including a selectable automated teller machine (ATM) option and a selectable fuel pump option;
receive a selection of the selectable ATM option;
in response to receiving the selection of the selectable ATM option, receive information about a bank card and a personal identification number (PIN), based on at least one of a card tap, a digital wallet tap, a card swipe, or a card insertion; and
display a user bank account on the display screen of the fuel pump, the user bank account corresponding to the bank card and including a set of selectable ATM services.

19. The at least one non-transitory machine-readable medium of claim 18, wherein the instructions further cause the processing circuitry to perform operations to:
receive a request to execute a transaction at the fuel pump;
receive a selection of a selectable ATM service of the set of selectable ATM services, the selectable ATM service including a money transfer corresponding to the transaction;
in response to receiving the selection, initiate the money transfer to a bank account corresponding to the fuel pump from the user bank account; and
in response to receiving confirmation of the money transfer, output an indication that the transaction was executed.

* * * * *